J. H. Robson,

Saw Jointer.

No. 102,160.   Patented Apr. 19, 1870.

John H. Robson

Witnesses
A. B. Wood, Jr.
J. L. Patterson

United States Patent Office.

JOHN H. ROBSON, OF OVID, MICHIGAN.

Letters Patent No. 102,160, dated April 19, 1870.

---

IMPROVEMENT IN MACHINE FOR JOINTING THE CLEARING-TEETH OF CROSSCUT-SAWS.

---

The Schedule referred to in these Letters Patent and making part of the same.

---

*To all whom it may concern:*

Be it known that I, JOHN H. ROBSON, of Ovid, in the county of Clinton and State of Michigan, have invented a new and useful Machine for Determining the Proper Length of the Hook or Clearing-Teeth of Crosscut-Saws, and also to be used as a file-guage when dressing said teeth to a proper length; and I do hereby declare that the following is a full, clear, and exact description of the construction and operation of the same, reference being had to the accompanying drawings making a part of this specification, in which—

Figure 1:
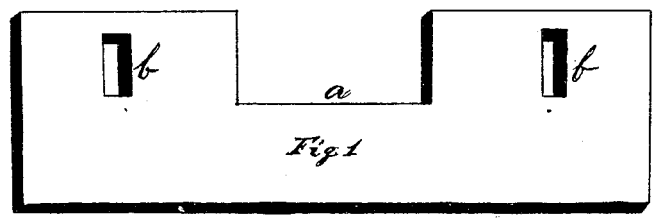
Figures 1 and 2 represent two pieces of cast-iron or other substance suitable for the purpose.

At letter $a$, fig. 1, the metal is to be chilled or case-hardened, so as to resist the action of the file, should they come in contact.

Figure 3:
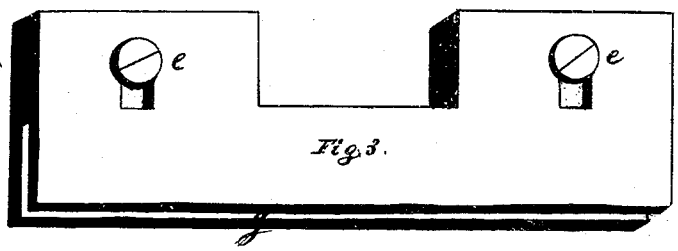
Figure 3 represents the two pieces above mentioned, attached to each other by two screws, and in proper adjustment for use.

Letters $b\ b$, fig. 1, represent two mortises, through which the two screws, seen at $e\ e$, fig. 3, work, and which admit of fig. 1 being raised or lowered to a proper adjustment.

Figure 2:
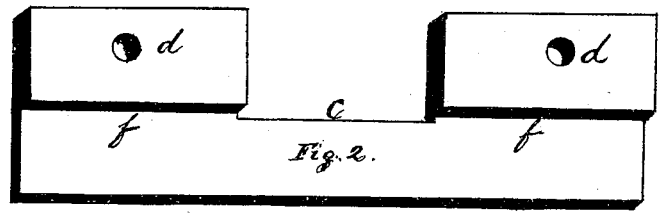

Letter $c$, fig. 2, shows the bottom of the gap dropped a little below the thick portions of that figure, as seen on each side of the gap. This is to carry it below the range of the file, the bottom of the gap, at $a$, fig. 1, being the gauge which determines the proper length of the clearing-teeth.

Letters $d\ d$, fig. 2, represent two holes passing through that piece, which are to be cut with a thread of the right proportion to receive the screws $e\ e$, fig. 3, which are also cut on that portion which passes through fig. 2. The upper half of fig. 2, on each side of the gap, is enough thicker than the lower half to admit the teeth-edge of the saw to pass up between figs. 1 and 2 as far as these projections on fig. 2, and so that a tooth, if longer than those on each side of it, will appear above the bottom of the gap, at $a$, fig. 1, showing that it should be cut down to the line at $a$ to make it of a proper length.

To use this machine, fasten the saw which is to be filed in a vise or other fastening, with the teeth up. Then let the operator take this machine, and, with fig. 1 toward him and the gap between the mortises $b\ b$, fig. 1, upward, then insert the upper edge of the saw in the opening $g$, fig. 3, and pass the machine down until the teeth of the saw rest on the projection seen at $f\ f$, fig. 2, and try the teeth by passing the machine along the edge of the saw. If a clearing-tooth appears above the bottom of the gap at $a$, fig. 1, cut it down to that line; if below that line, the teeth on each side must be filed down so that the clearing tooth will come up to the line.

What I claim as my invention, and desire to secure by Letters Patent, is—

The metallic pieces $f$ and $b$ and the screws $e\ e$, combined and arranged substantially as described and shown and for the purpose herein stated.

JOHN H. ROBSON.

Witnesses:
A. B. WOOD, Jr.,
J. Q. PATTERSON.